Jan. 7, 1936.  D. W. SHERMAN  2,026,658
AUTOMOBILE FRAME
Filed March 16, 1934   3 Sheets-Sheet 1
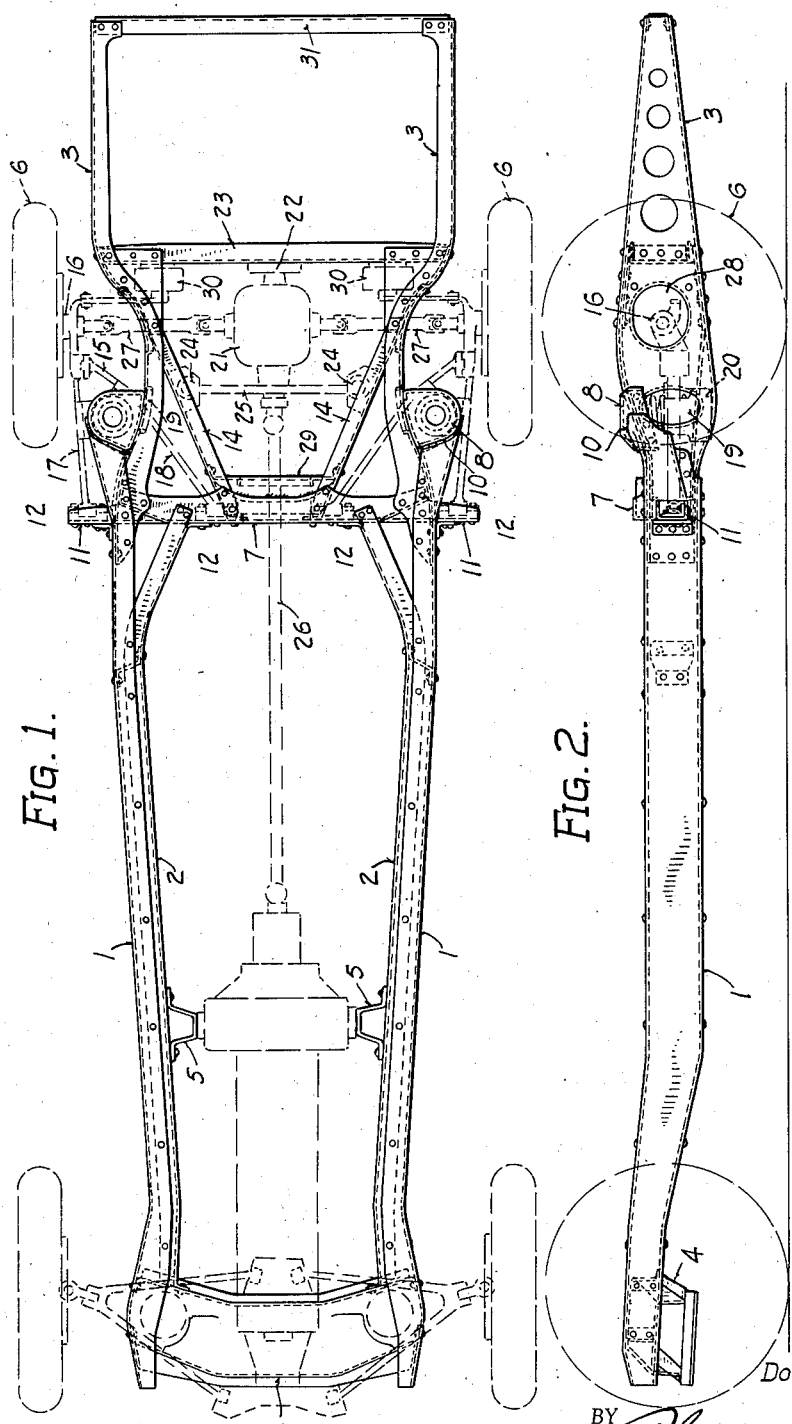
INVENTOR.
Donald W. Sherman
BY
ATTORNEY.

Jan. 7, 1936.   D. W. SHERMAN   2,026,658
AUTOMOBILE FRAME
Filed March 16, 1934   3 Sheets-Sheet 2
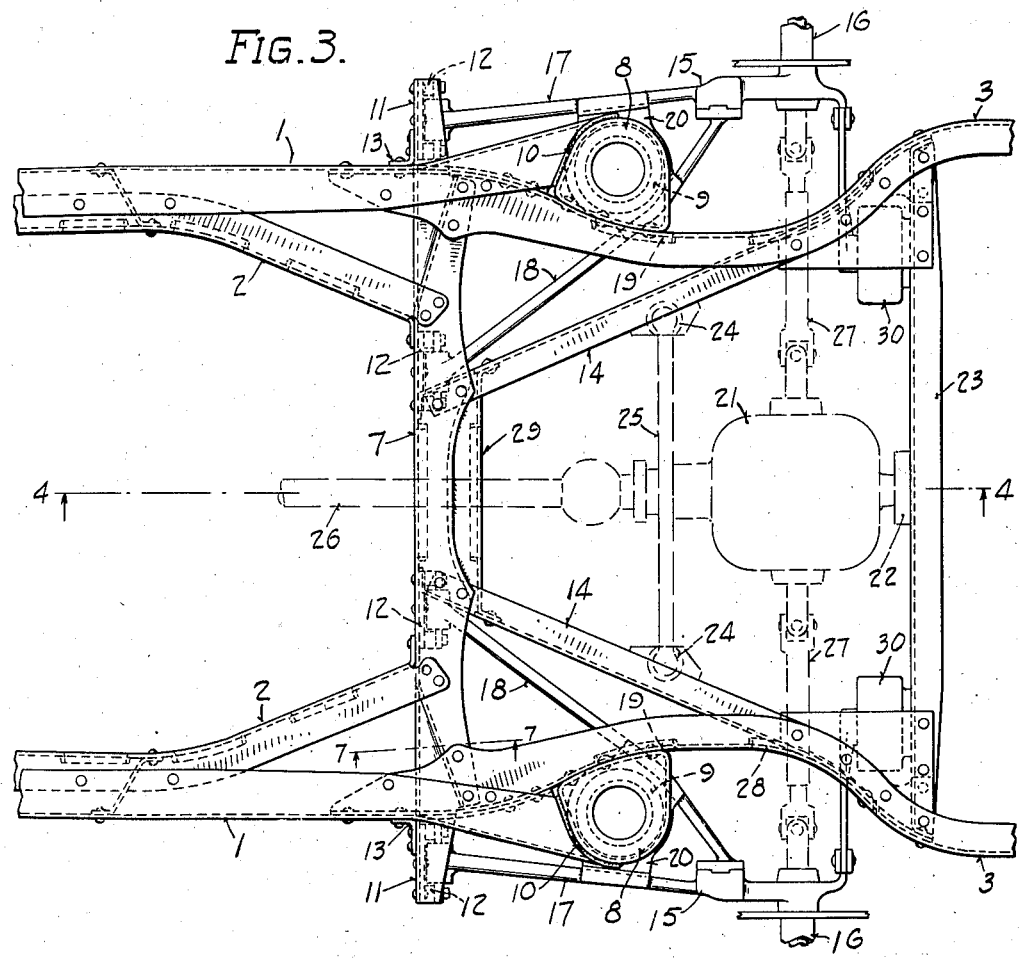
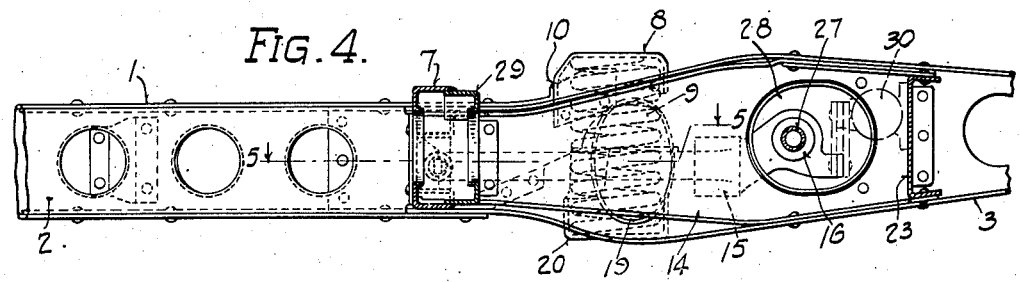
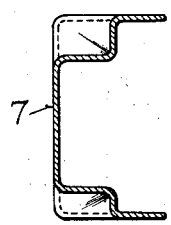
INVENTOR.
Donald W. Sherman
BY
ATTORNEY.

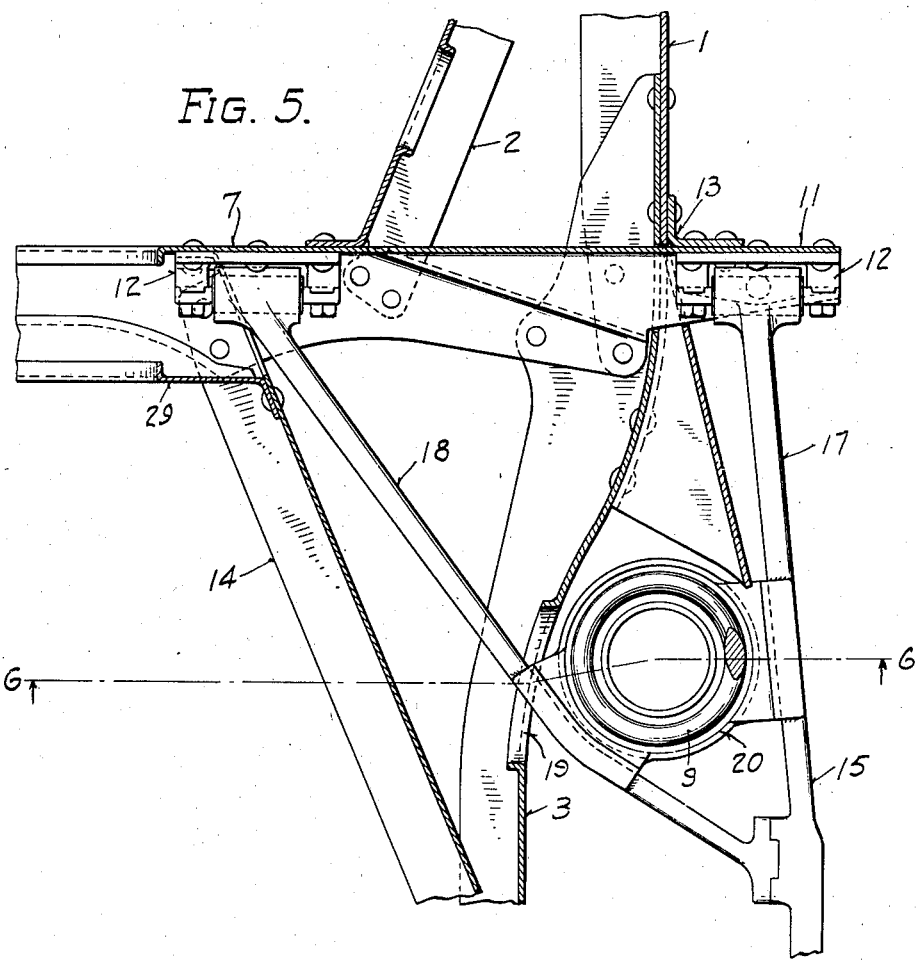
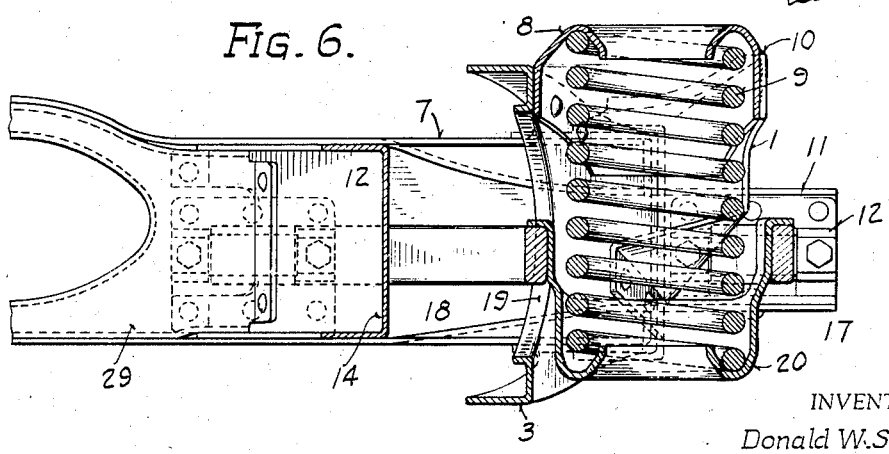

Patented Jan. 7, 1936

2,026,658

UNITED STATES PATENT OFFICE 2,026,658

AUTOMOBILE FRAME

Donald W. Sherman, Shorewood, Wis., assignor to A. O. Smith Corporation, Milwaukee, Wis., a corporation of New York Application March 16, 1934, Serial No. 715,819

12 Claims. (Cl. 280—106)

This invention relates to an automobile frame, and more particularly to a frame adapted for independent rear wheel suspension by the use of coil springs in compression.

The object of the invention is to provide a stronger frame and spring mounting at less cost, it being recognized that the saving of a few cents per frame may mean a difference of many thousands of dollars in annual production costs.

Other objects are to prevent waste of metal, to provide a lighter weight frame, and to provide a frame which may be more readily manufactured.

The accompanying drawings illustrate a frame made in accordance with the invention and the views therein are as follows:

Figure 1 is a top plan view of the frame,

Fig. 2 is a side elevation of the frame,

Fig. 3 is an enlarged plan view of a part of the frame,

Fig. 4 is a longitudinal central section on line 4—4 of Fig. 3,

Fig. 5 is a detail horizontal section on line 5—5 of Fig. 4,

Fig. 6 is a detail section through the spring on line 6—6 of Fig. 5, and

Fig. 7 is an enlarged section on line 7—7 of Fig. 3.

The frame comprises, in general, two sheet metal side bars 1, each having a sheet metal sub-rail 2 and a rearwardly extending sheet metal auxiliary rail 3. Suitable cross members are provided, as illustrated, to connect the side bars into a rigid frame structure.

The forward end of each side bar 1 is preferably curved outwardly at about the transverse center line of the forward wheels to receive the specially constructed front cross bar 4 adapted for independent suspension of the forward wheels. The detail construction of the forward end of the frame is more fully described in my application Serial No. 689,854, filed September 18, 1933, and constitutes no part of the present invention, it being understood that for the present purpose, the forward end of the frame may be constructed in any suitable manner.

The side bars 1 are of channel shape with the top and bottom flanges of the channel facing inwardly, while the sub-rails 2 are of similar construction with the top and bottom flanges facing outwardly and engaging the corresponding flanges of the side bars, making a substantially box-like rail for most of the length of the side bars. The corresponding flanges of the respective side bars and sub-rails are secured together in any suitable manner, rivets being generally employed for that purpose.

The forward ends of the sub-rails 2 preferably extend diagonally inward and are secured to the front cross bar 4 to serve as braces therefor.

Suitable brackets 5 may be provided on the side bars and sub-rails for supporting the rear end of the engine.

The side bars 1 extend rearwardly to a point short of the center line of the rear wheels 6 and are connected together by means of a cross bar 7 at a point forward of the ends of the bars.

The auxiliary channel-shaped sheet metal rails 3 are secured to the side bars 1 at a point forward of the cross bar 7 and extend rearwardly as far as desired, preferably to the rear end of the body of the car.

The ends of the side bars 1 are curved laterally outward at the rear of the cross bar 7 while the auxiliary rails 3 are curved laterally inward at the same location, to provide a space for an upper spring seat 8 for the coil spring 9. The upper spring seat 8 is formed from sheet metal and is a ring of inverted cup-shape cross section with its downwardly extending sides welded to the side bar 1 and riveted to the vertical web of the auxiliary rail 3. The shape of the spring seat 8 is preferably as shown, although various shapes may be suitably employed. The end edges of the upper flanges of the side bars 1 are preferably turned upwardly to provide welding seats for weld metal 10 which joins the same with the spring seats 8.

The cross bar 7 is of sheet metal channel construction and extends through the vertical webs of the side bars 1 and auxiliary rails 3 to provide brackets 11 on the outside of the frame. The channel of the cross bar 7 faces to the rear of the car and four bearing members 12 are secured therein, one in each of the brackets 11 and one on each side of the center of the bar 7. The shape of the cross bar varies, and in Fig. 7, taken at a point between the inner bearing 12 and the side bar 1, it has a double U-shape with the flanges secured to the flanges of the side bar 1 and the auxiliary rail 3. Only the central portion of this double U extends through the side bar 1 to form the bracket 11.

The cross bar 7 and bearings 12 are first assembled and then the bearings are machined to insure a proper alignment of the same. The sub-assembly unit thus produced is then inserted in the frame through openings in the side bars 1 and auxiliary rails 3 and riveted in place.

The rear ends of the sub-rails 2 are bent diagonally inward and secured to the cross bar 7 adjacent the outer end of the inner bearings 12 to brace the cross bar at these points. Angle iron braces 13 are provided at the forward side of the brackets 11 to brace the same and secure them to the side bars 1. A tie brace channel bar 14 extends from each auxiliary rail 3 at a point near the center line of the rear wheel 6 to the cross bar 7 and is secured to the latter at a point at the inner end of the inner bearing 12 to brace the cross bar at this point.

The two bearings 12 on each side of the frame constitute a pair for pivotally mounting a wishbone member 15 to the rear end of which a rear wheel 6 is secured by means of a stub axle 16. The members 15 are bifurcated at their forward ends to provide outer arms 17 extending forwardly to the outer bearings 12 in the brackets 11 and inner arms 18 extending diagonally inward to the inner bearings on the cross bar 7. The arms 18 pass through suitable openings 19 in the vertical webs of the auxiliary rails 3.

Spring seats 20 are provided across the corresponding arms 17 and 18 of each wishbone 15 for supporting the coil springs 9 directly below the upper spring seats 8. By this arrangement the frame and car proper are efficiently supported on the rear wheels and the coil springs 9 give the required spring action for comfortable riding.

The differential gears and housing 21, shown diagrammatically in Figure 1, are supported by suitable cushion bearings or mountings to prevent transmission of vibration to the frame and body. A bearing 22 is provided at the rear on a cross bar 23 and bearings 24 are provided on the tie braces 14 just forward of their attachment to the auxiliary rails 3. A cross member 25 extends between the bearings 24 and receives the drive tube 26. The drive tube 26 extends rearwardly from the engine, through an opening in the cross bar 7 to the differential 21. The rear wheels 6 are suitably driven by means of flexible shafts 27 extending from the differential 21 through openings 28 in the rails 3 and braces 14.

The cross bar 7 may be strengthened by providing a channel-shaped sub-bar 29 extending between the tie braces 14 and closing the rear side of the bar 7 to provide a box-like section therefor, as shown in Figs. 3 and 4.

Shock absorbers 30 are preferably provided at the rear ends of the wishbones 15 and may be of any suitable construction.

The auxiliary bars 3 are preferably of considerable depth, so as to provide the required height of the openings 19 and 28, to allow the desired spring action and relative vertical movement between the frame and the wheels. The upper limits of the openings 19 and 28 are such as to prevent engagement of the arms 18 and shafts 27 with the frame when the springs 9 are fully compressed, and the lower limits of the openings 19 and 28 are such as to ordinarily prevent engagement of the arms 18 and shafts 27 with the frame when the springs 9 are fully extended, the shock absorbers 30 tending to limit this latter movement also.

By constructing the frame with an auxiliary rail 3, separate from the side bar 1, a considerable amount of metal is saved due to the difference in height of the two bars and of the width of the metal sheets from which the bars are made. Furthermore, a stronger construction is provided.

The frame preferably extends rearwardly to support the fuel tank and other accessories at the rear end of the car, and for this purpose, the auxiliary rails 3 are extended rearwardly and provided with suitable cross bars 23 and 31.

Various embodiments may be employed within the scope and spirit of the invention as expressed in the accompanying claims.

I claim:

1. An automobile frame adapted for independent mounting of rear wheels by means of coil springs in the manner described comprising, a pair of side bars, an auxiliary rail for each side bar attached at its forward end to the side bar at a point substantially forward of the center line of the rear wheels and extending rearwardly therefrom, said side bars and the corresponding auxiliary rails being relatively separated laterally, a seat for a coil spring disposed in the space therebetween, and suitable cross bars connecting said side bars.

2. An automobile frame adapted for independent mounting of rear wheels by means of coil springs in the manner described comprising, side bars extending from the forward end of the frame to a point short of the center line of the rear wheels, an auxiliary rail for each side bar attached at its forward end to the side bar just forward of the rear end of the latter and extending rearwardly therefrom to a point beyond the center line of the rear wheels, said side bars and corresponding auxiliary rails being relatively separated laterally to provide a seat for a coil spring disposed in the space therebetween, said auxiliary rails having openings therethrough for receiving flexible drive shafts for the rear wheels and for receiving wishbone arms for mounting said wheels in a manner permitting their relative independent vertical movement, and suitable cross bars connecting said side bars.

3. An automobile frame adapted for independent mounting of rear wheels by means of coil springs in the manner described comprising, side bars extending from the forward end of the frame to a point short of the center line of the rear wheels, a cross bar connecting said side bars near the rear ends thereof, bearing members secured to the frame for pivotally attaching wishbone members for holding the rear wheels, and an auxiliary rail for each side bar attached thereto and extending rearwardly from said cross bar, said auxiliary rails being curved inwardly and the ends of said side bars being curved outwardly to provide a space and seat for a coil spring at each side of the frame and to the rear of said bearing members.

4. An automobile frame adapted for independent mounting of rear wheels by means of coil springs in the manner described comprising, side bars extending from the forward end of the frame to a point short of the center line of the rear wheels, a cross bar connecting said side bars near the rear ends thereof, bearing members secured to the cross bar for pivotally attaching wishbone members for holding the rear wheels, and an auxiliary rail for each side bar attached thereto and extending rearwardly from said cross bar, said auxiliary rails being curved inwardly and the ends of said side bars being curved outwardly to provide a space and seat for a coil spring at each side of the frame and to the rear of said bearing members, and said auxiliary bars being of substantial height and having openings therethrough for receiving parts of the wishbone member and a flexible drive shaft for each wheel, thereby permitting relative vertical movement of the wheels.

5. In an automobile frame adapted for independent mounting of rear wheels, a sheet metal channel shaped cross bar having its ends extending through the respective side bars of the frame, and a plurality of bearing members secured within the cross bar at each end thereof for pivotally mounting wishbone members, said bar and bearing members constituting an independent sub-assembly unit for fabrication purposes, permitting said bearing members to be machined in alignment.

6. In an automobile frame adapted for independent mounting of rear wheels, a sheet metal channel shaped cross bar having its ends extending through the respective side bars of the frame, and a bearing member at each end thereof outside of said side bars for pivotally mounting a wheel mounting arm, said bar and bearing members constituting an independent sub-assembly unit for fabrication purposes, permitting said bearing members to be machined in alignment.

7. In an automobile frame adapted for independent mounting of rear wheels by means of coil springs in the manner described, a pair of side bars, a cross bar therefor extending through said side bars and providing brackets extending there-beyond, and bearings attached to said cross bar, one on each bracket and one on either side of the longitudinal center of the frame and between said side bars.

8. In an automobile frame adapted for independent mounting of rear wheels, a pair of side bars, a cross bar therefor extending through said side bars and providing brackets extending there-beyond, bearings attached to said brackets, and braces extending forwardly from said cross bar at points adjacent said bearings to said side bars.

9. In an automobile frame adapted for independent mounting of rear wheels by means of coil springs in the manner described, a pair of side bars, a cross bar therefor extending through said side bars and providing brackets extending therebeyond, bearings attached to said cross bar, one on each bracket and one on either side of the longitudinal center of the frame and between said side bars, and braces extending forwardly from said cross bar at points adjacent said bearings to said side bars.

10. An automobile frame adapted for independent mounting of rear wheels by means of coil springs in the manner described comprising, a pair of side bars extending from the forward end of the frame to a point short of the center line of the rear wheels, a cross bar connecting said side bars near the rear ends thereof and extending laterally beyond said side bars to provide brackets, a pair of bearing members secured at each end of said cross bar, one on each bracket and one on either side of the longitudinal center of the frame and between said side bars, and an auxiliary rail for each side bar, said side bars and the corresponding auxiliary rails being relatively separated laterally to provide a seat and space for coil spring.

11. In an automobile frame, a pair of spaced channel side bars extending longitudinally of the frame and a sheet metal channel-shaped cross bar having its upper and lower flanges secured to the respective upper and lower flanges of the side bars and having its vertical web reduced in height at the ends, the end portions of said cross bar being of smaller dimension than the body portion thereof and extending through the vertical webs of the respective side bars.

12. In an automobile frame, a pair of spaced channel side bars extending longitudinally of the frame, a sheet metal channel-shaped cross bar having its ends extending through the vertical webs of the respective side bars and its flanges secured to the respective flanges of the side bars, said end portions of the cross bar being of less height than the height of the vertical webs of the side bars, and braces joining the said end portions of the cross bar to the vertical webs of the side bars.

DONALD W. SHERMAN.